| United States Patent [19] | [11] Patent Number: 5,041,479 |
| --- | --- |
| Ogoe | [45] Date of Patent: Aug. 20, 1991 |

[54] DISPERSING IGNITION RESISTANT ADDITIVES INTO CARBONATE POLYMERS

[75] Inventor: Samuel A. Ogoe, Missouri City, Tex.

[73] Assignee: The Dow Chemical Company, Midland, Mich.

[21] Appl. No.: 398,036

[22] Filed: Aug. 24, 1989

Related U.S. Application Data

[63] Continuation-in-part of Ser. No. 286,918, Dec. 20, 1988, abandoned, which is a continuation-in-part of Ser. No. 132,495, Dec. 14, 1987, abandoned.

[51] Int. Cl.$^5$ .................... C08K 3/30; C08K 5/43
[52] U.S. Cl. .................... 524/168; 523/351; 524/411; 524/412; 524/423; 524/467
[58] Field of Search .............. 523/351; 524/411, 412, 524/467, 168, 423; 562/462

[56] References Cited

U.S. PATENT DOCUMENTS

| 3,166,606 | 1/1965 | Reinking et al. | 525/462 |
| 4,268,432 | 5/1981 | Maslen et al. | 523/351 |
| 4,464,487 | 8/1984 | Thomas et al. | 524/413 |
| 4,530,880 | 7/1985 | Taniuchi et al. | 524/467 |
| 4,626,563 | 12/1986 | Ogoe et al. | 524/168 |
| 4,650,823 | 3/1987 | Krishnan | 524/611 |
| 4,762,896 | 8/1988 | Fox et al. | 325/462 |

*Primary Examiner*—Veronica P. Hoke

[57] ABSTRACT

A process for dispersing one or more powdered ignition resistant or flame retardant additives into carbonate polymers which comprises the steps of preparing a base concentrate having about 5 to about 50 weight per cent of said additives by blending said additives with a carbonate polymer having a melt flow rate from about 3 to about 20, pelletizing said base concentrate having said ignition resistant additive dispersed therein, dry blending said concentrate pellets with carbonate pellets having a melt flow rate from about 1 to about 80 whereby said polymer/concentrate blend has an amount of said additive dispersed therein effective to render said blend ignition resistant, and pelletizing or molding said carbonate polymer/concentrate blend. The use of this method gives ignition resistant carbonate polymers with improved impact properties as measured by Izod impact tests.

22 Claims, No Drawings

DISPERSING IGNITION RESISTANT ADDITIVES INTO CARBONATE POLYMERS

CROSS REFERENCE TO RELATED APPLICATIONS

This application is a continuation-in-part of Ser. No. 286,918 filed Dec. 20, 1988 which is a continuation-in-part of Ser. No. 132,495 filed Dec. 14, 1987 all now abandoned.

BACKGROUND OF THE INVENTION

This invention relates to a composition and a process for the production of ignition resistant or flame retardant polycarbonates and/or carbonate polymers wherein the ignition resistant additives are first compounded into a polycarbonate carrier resin then blended with a low molecular weight or moldable polycarbonate.

It is known from U.S. Pat. No. 4,626,563 that aromatic sulfimide metal salts, monomeric or polymeric halogenated aromatic compounds, metal salts of inorganic acids having a pKa from 1 to 5, and fibril forming polytetrafluoroethyene are useful to render carbonate polymers ignition resistant or flame retardant. Other flame retardant additives are known from and listed in U.S. Pat. No. 4,650,823. These patents are incorporated by reference herein.

SUMMARY OF THE INVENTION

The present invention is broadly directed to a process for dispersing one or more powdered ignition resistant or flame retardant additives into carbonate polymers wherein the impact properties of the ignition resistant carbonate polymers is improved.

More specifically, the invention is directed to a process for dispersing one or more powdered ignition resistant or flame retardant additives into carbonate polymers which comprises the steps of preparing a base concentrate having about 5 to about 50 weight percent of said additives by blending said additives with a carbonate polymer having a melt flow rate from about 3 to about 80 and preferably a MFR in the range of 3 to 20, pelletizing said base concentrate having said ignition resistant additive dispersed therein, dry blending said concentrate pellets with carbonate polymer pellets having a melt flow rate from about 1 to about 80 whereby said polymer/concentrate blend has an amount of said additive dispersed therein effective to render said blend ignition resistant, and pelletizing or molding said carbonate polymer/concentrate blend.

The process of this invention has the following steps:
(A) making a polymer/concentrate by pelletizing a carbonate polymer having a melt flow rate in the range from about 3 to about 80 with the composition comprising,
  (i) 2.0 to 10% by weight of a metal salt of an aromatic sulfur containing compound,
  (ii) 10 to 80% by weight of a monomeric, oligomeric or polymeric halogenated aromatic compound,
  (iii) 2.0 to 10.0% by weight of compound selected from the group consisting of a metal salt of an inorganic compound and a free aromatic sulfimide, and
  (iv) 6 to 40% by weight of a fibril forming polytetrafluoroethyene, (B) blending said concentrate pellets with carbonate polymer pellets having a melt flow rate from about 1 to about 80 and substantially lower than said first carbonate polymer whereby said polymer/concentrate blend has an amount of said additives dispersed therein effective to render said blend ignition resistant, and
(C) pelletizing or molding said carbonate polymer/concentrate blend.

The advantages of the invention over the known techniques are that significant improvement is seen in the toughness of the final product as measured by improved Izod impact tests when the polymer concentrate is first made and diluted down with additional polymer. In addition, the generation of dust particles which is commonly found in additive compounding is eliminated.

DETAILED DESCRIPTION OF THE INVENTION

The carbonate polymers employed in the present invention are advantageously aromatic carbonate polymers such as the trityl diol carbonates described in U.S. Pat. Nos. 3,036,036; 3,036,037; 3,036,038 and 3,036,039; polycarbonates of bis(ar-hydroxyphenyl) alkylidenes (often called bisphenol-A type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the polycarbonate may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Also suitable for the practice of this invention are blends of any one of the above carbonate polymers. Also included in the term carbonate polymer are the ester/carbonate copolymers of the types described in U.S. Pat. Nos. 3,169,121; 4,105,633; 4,156,069; 4,225,556; 4,260,731; 4,287,787; 4,330,662; 4,355,150; 4,360,656; 4,374,973; and 4,388,455. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

The monomeric, oligomeric or polymeric halogenated aromatic compound used in this invention can be virtually any halogenated organic compound commonly used as a fire retardant additive. The preferred compounds are the halo-substituted aromatic compounds (halo is fluoro, chloro, or bromo). Suitable compounds include, for example, decabromo diphenyloxide, tris(tribromophenoxy) triazine, decabromodiphenylcarbonate, an oligomer or polymer of tetrabromobisphenol A, and a copolymer of bisphenol A/tetrabromobisphenol A. Combinations of the above identified compounds can be employed. Examples of other suitable monomeric and polymeric halogenated compounds are disclosed in U.S. Pat. No. 4,263,201, which is incorporated herein by reference.

The metal salts of sulfur compounds used herein include metal salts of aromatic sulfonates, sulfates, sulfonamides, and sulfimides. Suitable metals are the metals of Groups I and IIA of the Periodic Chart as well as copper, aluminum, and antimony. The preferred metal is an alkali metal such as sodium or potassium.

The preferred group of aromatic sulfur compounds are sulfimides having the formula

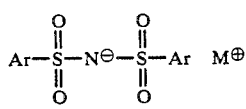

wherein Ar is an aromatic group and M is a metal cation.

Examples of the sulfimide salts are the alkali metal salts of saccharin, N-(p-tolylsulfonyl)-p-toluene sulfimide, N-(N'-benzylaminocarbonyl)sulfanilimide, N-(phenylcarboxyl)-sulfanilimide, N-(2-pyrimidinyl)-sulfanilimide, and N-(2-thiazolyl)sulfanilimide. These salts and similar ones are disclosed in U.S. Pat. No. 4,254,015 which is incorporated herein by reference in its entirety.

The free aromatic sulfimides useful in this invention are those having a pKa in the range from about 1 to about 3. Examples of such free aromatic sulfimides are saccharin, N-(p-tolylsulfonyl)-p-toluene sulfimide, N-(N'-benzylaminocarbonyl)sulfanilimide, N-(phenylcarboxyl)-sulfanilimide, N-(2-pyrimidinyl)sulfanilimide, and N-(2-thiazolyl)sulfanilimide. They are further illustrated by the formula

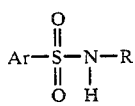

wherein R is carbonyl, arylcarbonyl, arylaminocarbonyl, aralkylaminocarbonyl, or arylsulfonyl. Specific examples of these groups are benzoyl, benzylaminocarbonyl and tolylsulfonyl groups.

In general, the additive package has a fixed weight ratio of components so that after the polymer concentrate is made it can be readily shipped without dust formation to desired locations where it can be diluted down or let down with more polymer to the final ignition resistant product. The preferred ratio of components is; metal salt of an aromatic sulfur containing compound:monomeric, oligomeric or polymeric halogenated aromatic compound:metal salt of an inorganic compound:fibril forming polytetrafluoroethyene (1:10:1:3). For example, a 15% additive/polymer concentrate is blended with more polymer at a 10:1 ratio to give a useful ignition resistant blend.

In addition to the aforementioned fire retardant additives, other additives can be included in the carbonate polymer composition of the present invention such as fillers (i.e. glass fibers), pigments, dyes, antioxidants, stabilizers, ultraviolet light absorbers, mold release agents, impact modifiers and other additives commonly employed in carbonate polymer compositions.

The following examples and controls are presented to further illustrate the invention.

EXAMPLE 1

A fifteen percent ignition resistant (IR) polycarbonate concentrate is prepared by adding 1 gram (1%) potassium paratolylsulfimide (KPTSM) 1 gram (1%) potassium bisulfate (KHSO4), 3 grams (3%) fibril forming polytetrafluoroethylene (Teflon 6C) and 10 grams (10%) tetrabromobisphenol-A oligomer (TBBPA), all in one masterbatch, to 85 gms (85%) heat stabilized polycarbonate resin having a 22 gms/10 min MFR (melt flow rate). The KPTSM is represented by the formula:

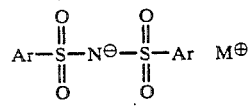

wherein Ar is a paratolyl group and M is potassium.

The additive masterbatch and polycarbonate pellets are blended on a rotating blender (Lightnin blender) for one minute with agitation. The resultant blended material is gradually fed to a 30 mm twin screw extruder having a 250° C. barrel temperature. The extruded pellets are post blended on a paint shaker to ensure uniform mixing.

The 15% IR concentrate is let down in or blended with a base polycarbonate at 10 to 1 ratio. The base polycarbonate had a 15 gms/10 minute melt flow rate (MFR). The mixture was blended on Lightnin blender for 1 minute. The blended pellets are extruded on 30 mm twin screw extruder at 275° C. barrel temperature to make a 15 MFR ignition resistant polycarbonate product. The final product is dried in an oven for 3 hours at 125° C. and molded into bars for flammability and Izod impact tests. If desired the IR concentrate and base polycarbonate can be fed separately into the twin screen extruder or can be directly molded into various parts.

EXAMPLE 2

The procedure for Example 1 was repeated using 1 gm (1%) paratolylsulfimide (HPTSM) in place of the KHSO4.

EXAMPLE 3

The procedure for Example 1 was repeated using a 30 weight % IR concentrate. This concentrate contained:
2% potassium paratolylsulfimide,
2% potassium bisulfate,
6% fibril forming polytetrafluoroethylene and
20% tetrabromobisphenol-A oligomer.

This 30% concentrate was blended with a base polycarbonate at a 20 to 1 letdown ratio.

EXAMPLE 4

The procedure for Example 2 was repeated using the above 30% IR concentrate at a 20 to 1 letdown ratio.

Control A

The procedure for Example 1 was repeated using only the base resin without either IR concentrate or IR masterbatch.

Control B

The procedure for Example 1 was repeated using only 1.5% IR additive masterbatch without concentrate.

The above examples and controls were tested for Izod impact strength and the results are shown in Table I.

TABLE I

| Sample | PC carrier (MFR in gms/10 min.) | Izod Impact (10 mil notched at 25° C.; ASTM D-259-84) Izod Impact | % Brittle |
|---|---|---|---|
| Cntrl A (Base Polymer) | N.A. | 15.0 ft.lb./in. | 0 |
| Cntrl B (Cntrl A + 1.5% IR Masterbatch) | N.A. | 3.0 ft.lb./in. | 100 |
| Example 1 15% I.R. concentrate with 10:1 letdown | 22 | 14.5 ft.lb./in. | 0 |
| Example 2 15% I.R. concentrate with 10:1 letdown | 22 | 14.7 ft.lb./in. | 0 |
| Example 3 30% I.R. concentrate with 20:1 letdown | 22 | 13.0 | 10 |
| Example 4 30% I.R. concentrate with 20:1 letdown | 22 | 13.3 | 10 |

Table 1 shows that the use of IR concentrate at either 10 to 20 to 1 letdown (15 or 30%) resulted in improved Izod impact properties without any brittle breaks versus IR additive masterbatch which resulted in very low Izod impact with 100% brittle breaks. The improvement of Izod impact via the use of IR concentrate is attributed to more uniform additive dispersion using IR concentrate than using IR masterbatch.

The above examples and controls were further tested for ignition resistance or flammability using the well known UL-94 test. The results are shown in Table II.

TABLE II

| Sample | UL-94 Test (1/16") Avg. T-Sec | Number of Drips | Rating |
|---|---|---|---|
| Control A | 10.3 | 5/5 | V-2 |
| Control B | 1.0 | 0/5 | V-0 |
| Example 1 | 1.2 | 0/5 | V-0 |
| Example 2 | 1.5 | 0/5 | V-0 |
| Example 3 | 1.1 | 0/5 | V-0 |
| Example 4 | 1.3 | 0/5 | V-0 |

Note:
T-Sec means time in seconds for a flame out

Table II shows the use of IR concentrate does not detract from the flammability properties of final product.

EXAMPLE 5

The procedure for Example 3 was repeated using a 20 MFR polycarbonate carrier.

EXAMPLE 6

The procedure for Example 4 was repeated using a 15 MFR polycarbonate carrier.

EXAMPLE 7

The procedure for Example 4 was repeated using a 10 MFR polycarbonate carrier.

Control C

The procedure for Example 3 was repeated using a 40 MFR polycarbonate carrier.

Control D

The procedure for Example 3 was repeated using a 80 MFR polycarbonate carrier.

The above examples and controls were tested for Izod impact strength and the results are shown in Table III.

TABLE III

| Sample | PC Carrier (MFR) | Izod Impact (10 mil notched at 25° C.; ASTM D-259-84) Izod Impact (ft.lb./in) | % Brittle |
|---|---|---|---|
| Cntrl A (Base Polymer) | N.A. | 15.0 | 0 |
| Cntrl C (Cntrl A + 30% IR concentrate at 20 to 1 ratio) | 40 | 7.5 | 50 |
| Cntrl D (Cntrl A + 30% IR concentrate at 20 to 1 ratio) | 80 | 3.0 | 100 |
| Example 5 (Cntrl A + 30% IR concentrate at 20 to 1 ratio) | 20 | 13.0 | 0 |
| Example 6 (Cntrl A + 30% IR concentrate at 20 to 1 ratio) | 15 | 14.5 | 0 |
| Example 7 (Cntrl A + 30% IR concentrate at 20 to 1 ratio) | 10 | 14.0 | 10 |

The above controls and/or examples show that high melt flow rate polycarbonates are not effective as carriers as the low MFR carriers.

The above examples and controls were further tested for ignition resistance using the UL-94 test. The results are shown in Table IV.

TABLE IV

| Sample | UL-94 Test (1/16") Avg. T-Sec | Number of Drips | Rating |
|---|---|---|---|
| Control A | 10.3 | 5/5 | V-2 |
| Control C | 1.0 | 0/5 | V-0 |
| Control D | 2.0 | 0/5 | V-0 |
| Example 5 | 1.0 | 0/5 | V-0 |
| Example 6 | 1.0 | 0/5 | V-0 |
| Example 7 | 1.0 | 0/5 | V-0 |

Note:
T-Sec means time in seconds for a flame out

Tables III and IV show that lower MFR polycarbonate carriers help to improve the Izod impact strength of the polymer better than higher MFR PC carriers without sacrificing the flammability property of the final product.

I claim:

1. A process for dispersing powdered ignition resistant additives into carbonate polymers to make polymers having an embrittlement of 10% or less which comprises
   (A) making a polymer/concentrate by melt blending and pelletizing a carbonate polymer having a melt flow rate in the range of from about 3 to about 80 with from about 5 up to about 50 weight percent based on concentrate weight of one or more powdered ignition resistant or flame retardant additives and including one or more of the flame retardant additives selected from the group consisting of:
  (i) a metal salt of a sulfur containing compound,
  (ii) a monomeric, oligomeric or polymeric halogenated aromatic compound,
  (iii) a metal salt of an inorganic compound
  (iv) a free aromatic sulfimide, and
  (v) a fibril forming polytetrafluoroethylene,
(B) blending said concentrate pellets with carbonate polymer pellets having a melt flow rate from about 1 to about 80 whereby said polymer/concentrate blend has an amount of said additives dispersed therein effective to render said blend ignition resistant, and
(C) pelletizing or molding said carbonate polymer/concentrate blend.

2. The process of claim 1 wherein said aromatic sulfur containing compound is an aromatic sulfonate, aromatic sulfate, aromatic sulfonamide or aromatic sulfimide.

3. The composition of claim 2 wherein the aromatic sulfimide additive consists of an alkali metal salt of paratolylsulfimide.

4. The process of claim 1 wherein said halogenated aromatic compound is tetrabromobisphenol-A oligomer.

5. The process of claim 1 wherein said metal salt of an inorganic compound is potassium bisulfate.

6. The process of claim 1 wherein said free aromatic sulfimide is paratolylsulfimide.

7. A process for dispersing powdered ignition resistant additives into carbonate polymers to make polymers having an embrittlement of 10% or less which comprises
  (A) making a polymer/concentrate by pelletizing a bis phenol A polycarbonate having a melt flow rate in the range from about 3 to about 80 with the composition comprising
    (i) 2.0 to 10% by weight of a metal salt of an aromatic sulfur containing compound,
    (ii) 10 to 80% by weight of a monomeric, oligomeric or polymeric halogenated aromatic compound,
    (iii) 2.0 to 10.0% by weight of compound selected from the group consisting of a metal salt of an inorganic compound and a free aromatic sulfimide, and
    (iv) 6 to 40% by weight of a fibril forming polytetrafluoroethyene,
  (B) blending said concentrate pellets with a bis phenol A polycarbonate polymer pellets having a melt flow rate from about 1 to about 80 and substantially lower than said first polycarbonate whereby said polymer/concentrate blend has an amount of said additives dispersed therein effective to render said blend ignition resistant, and
  (C) pelletizing or molding said bis phenol A polycarbonate polymer/concentrate blend.

8. The process of claim 7 wherein said aromatic sulfur containing compound is an aromatic sulfonate, aromatic sulfate, aromatic sulfonamide or aromatic sulfimide.

9. The composition of claim 8 wherein the aromatic sulfimide additive consists of an alkali metal salt of paratolylsulfimide.

10. The process of claim 7 wherein said halogenated aromatic compound is tetrabromobisphenol-A oligomer.

11. The process of claim 7 wherein said metal salt of an inorganic compound is potassium bisulfate.

12. The process of claim 7 wherein said free aromatic sulfimide is paratolylsulfimide.

13. A process for dispersing one or more powdered ignition resistant or flame retardant additives selected from the group consisting of a metal salt of a sulfur containing compound; a monomeric, oligomeric or polymeric halogenated aromatic compound; a metal salt of an inorganic compound; a free aromatic sulfimide; and a fibril forming polytetrafluoroethylene into carbonate polymers to make polymers having an embrittlement of 10% or less which comprises
  (A) preparing a base concentrate having about 5 to about 50 weight percent of said additives by dry blending said additives with a carbonate polymer having a melt flow rate from about 3 to about 80,
  (B) melt blending and pelletizing said base concentrate having said ignition resistant additive dispersed therein,
  (C) blending said concentrate pellets with carbonate polymer pellets having a melt flow rate from about 1 to about 80 whereby said polymer/concentrate blend has an amount of said additive dispersed therein effective to render said blend ignition resistant, and
  (D) pelletizing or molding said carbonate polymer/concentrate blend.

14. The process of claim 13 wherein the additives consist of a mixture of a metal salt of an aromatic sulfur containing compound, a monomeric, oligomeric or polymeric halogenated aromatic compound, a metal salt of an inorganic compound or a free aromatic sulfimide, and a fibril forming polytetrafluoroethyene.

15. The process of claim 13 wherein the additives consist of an alkali metal salt of paratolylsulfimide, tetrabromobisphenol-A oligomer, an alkali metal sulfate salt and fibril forming polytetrafluoroethyene.

16. A process for dispersing one or more powdered ignition resistant additives into a bis phenol A polycarbonate to make polymers having an embrittlement of 10% or less which comprises
  (A) preparing a base concentrate or polymer/concentrate blend having about 5 to about 80 weight percent of said additives by dry blending said additives with a polycarbonate resin homopolymer made from bis phenol A and having a melt flow rate from about 3 to about 20,
  (B) pelletizing said base concentrate having said ignition resistant additive dispersed therein,
  (C) blending said concentrate pellets with polycarbonate resin pellets having a melt flow rate from about 1 to about 80 whereby said polymer/concentrate blend has an amount of said additive dispersed therein effective to render said blend ignition resistant, and
  (D) pelletizing or molding said carbonate polymer/concentrate blend.

17. The process of claim 16 wherein the additives consist of a mixture of a metal salt of an aromatic sulfur containing compound, a monomeric, oligomeric or polymeric halogenated aromatic compound, a metal salt of an inorganic compound or a free aromatic sulfimide, and a fibril forming polytetrafluoroethyene.

18. The process of claim 17 wherein the additives consist of an alkali metal salt of paratolylsulfimide, tetrabromobisphenol-A oligomer, an alkali metal sulfate salt and fibril forming polytetrafluoroethyene.

19. The process of claim 1 wherein the carbonate polymer in step (A) has a melt flow rate in the range of from about 3 to less than 40.

20. The process of claim 13 wherein the carbonate polymer in step (A) has a melt flow rate in the range of from about 3 to less than 40.

21. The process of claim 1 wherein the powdered ignition resistant or flame retardant additives comprise a metal salt of a sulfur containing compound and a fibril forming polytetrafluoroethylene.

22. The process of claim 13 wherein the powdered ignition resistant or flame retardant additives comprise a metal salt of a sulfur containing compound and a fibril forming polytetrafluoroethylene.

* * * * *